May 17, 1955　　　W. A. HELSTEN　　　2,708,492
BRAKE ROTOR WITH REMOVABLE FRICTION MEMBERS
Original Filed Oct. 23, 1944　　　2 Sheets-Sheet 2
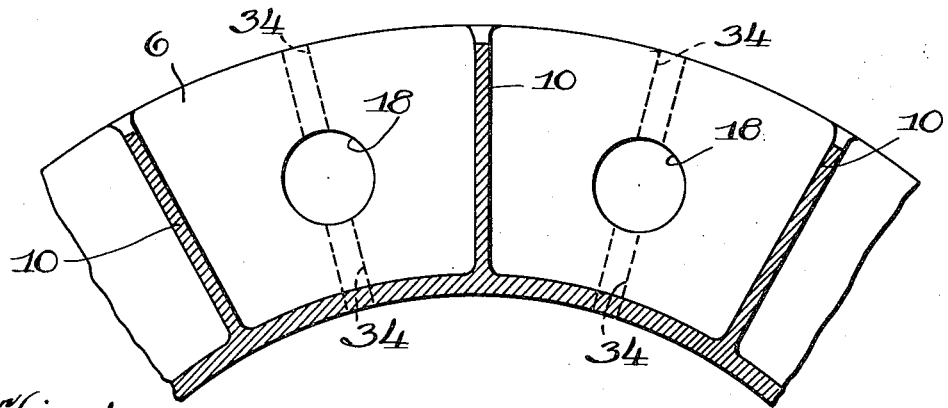
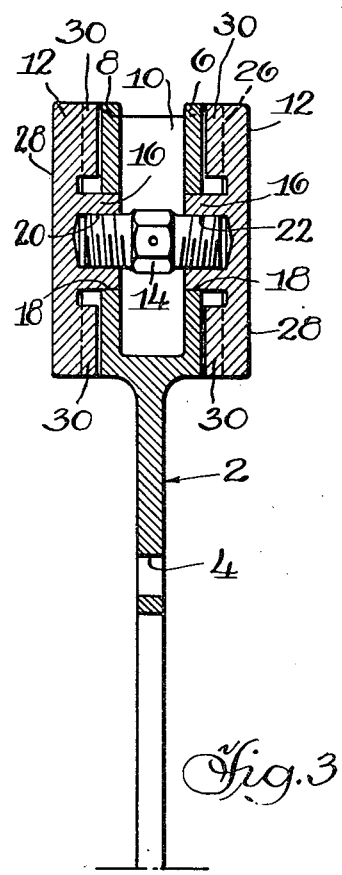
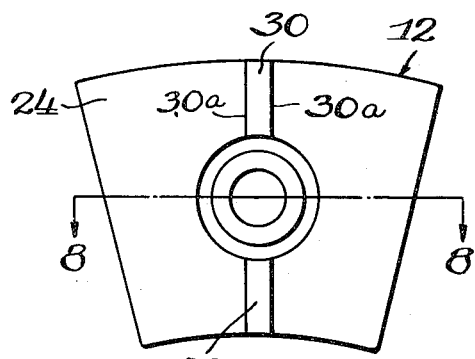
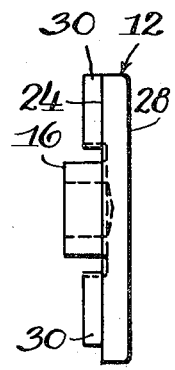
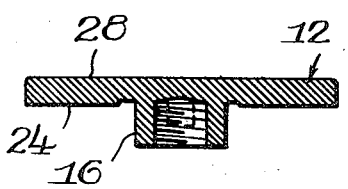
INVENTOR.
Wesley A. Helsten
BY
Atty.

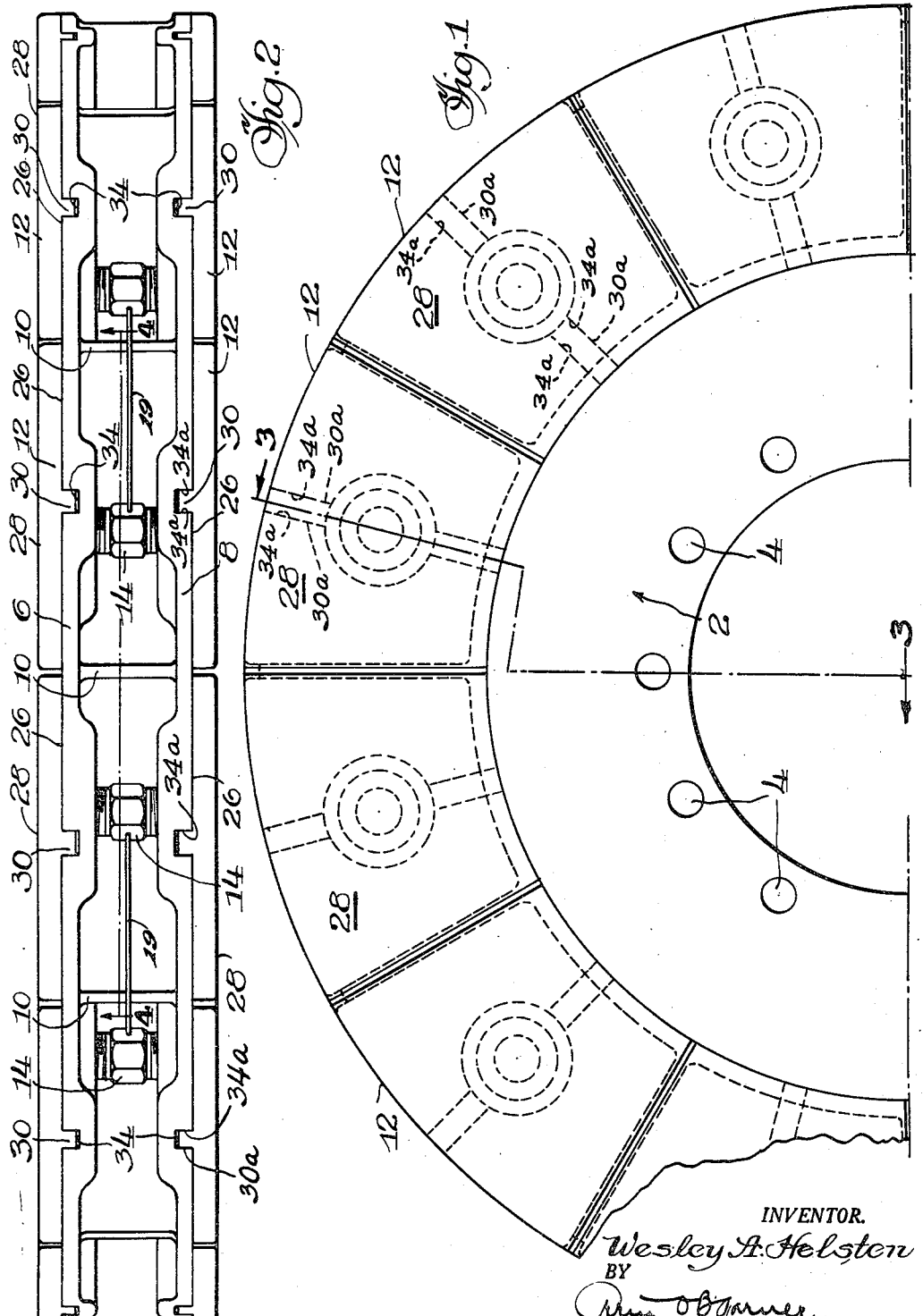

United States Patent Office 2,708,492
Patented May 17, 1955

2,708,492

BRAKE ROTOR WITH REMOVABLE FRICTION MEMBERS

Wesley A. Helsten, Chicago, Ill., assignor to American Steel Foundries, Chicago, Ill., a corporation of New Jersey Continuation of application Serial No. 559,869, October 23, 1944. This application May 29, 1951, Serial No. 228,902

17 Claims. (Cl. 188—218)

My invention relates to brake rotors and more particularly to a novel rotor adapted for use in railway brake equipment wherein high speeds result in the development of intense heat on the friction surfaces of the rotor. This application is a continuation of my co-pending application, filed October 23, 1944, Serial No. 559,869, now abondoned.

The general object of my invention is to design an arrangement in which the metallic brake surfaces may "grow" radially under service conditions as the result of the intense heat combined with the relatively great centrifugal force caused by the high rate of rotation of the rotor. This "growth" is permanent deformation of the metal and is not to be confused with mere thermal expansion which normally results from the heating of a metallic member.

A specific object of my invention is to design an annular brake rotor comprising a steel support structure to which cast iron friction members or blocks are removably secured in such manner as to permit the "growth" above described.

In my novel rotor the support structure comprises a hub with spaced annular webs and the segmental friction members are arranged in pairs, each pair of said members being held on the remote sides of the respective webs for rotation therewith by means extending between and connected to the members, said means being adjustable for varying the pressure under which said members are forced to cling to said webs.

In the drawings, Figure 1 is a fragmentary side elevation of a rotor embodying my invention, only a portion of the rotor being illustrated inasmuch as it is a symmetrical annular object. Figure 2 is a top plan view of the structure shown in Figure 1. Figure 3 is a sectional view taken in the radial planes indicated by the line 3—3 of Figure 1, and Figure 4 is a sectional view taken in the vertical plane indicated by the line 4—4 of Figure 2 with the segmental friction blocks removed.

Figures 5–8, inclusive, illustrate in detail one of the novel friction members or blocks utilized in my arrangement. Figure 5 being an elevational view taken from the rear face of the block, Figure 6 being a top plan view, Figure 7 being an edge elevation taken from the right as seen in Figure 5, and Figure 8 being a sectional view taken in the plane indicated by the line 8—8 of Figure 5.

Describing my invention in detail and referring first to Figures 1–4, inclusive, my novel rotor includes a hub, generally designated 2, and comprising a plurality of opening 4, 4 for the reception of securing means for attaching the rotor to an associated rotatable element, such as, for example, the wheel of a railway car truck. The hub 2 is preferably of steel and is integrally formed at its outer perimeter with spaced annular webs 6 and 8, as best seen in the sectional view of Figure 3, and a plurality of substantially radial ribs or columns 10, 10 extend between the webs 6 and 8 to resist braking pressures applied against the segmental friction members or blocks, as hereinafter described.

The friction members or blocks 12, 12, preferably formed of cast iron, are arranged in pairs and are secured to the webs 6 and 8 by studs or bolts 14, 14 extending between the respective pairs in threaded engagement with bosses 16, 16 on the members extending through complementary openings 18, 18 in the webs. Each stud 14, as best seen in Figure 3, is in righthand threaded engagement at 20 with one of the associated members and in lefthand threaded engagement at 22 with the other of the associated members, whereby, as the stud is rotated, the members are drawn snugly against the webs 6 and 8. Each stud is connected by a wire 19 (Figure 2) to the adjacent stud, thereby preventing accidental rotation thereof under service conditions.

One of the friction members 12 is shown in detail in Figures 5–8, inclusive, from which it will be seen that the member is formed as a segment of a circle with a flat bearing face 24 on the rear surface thereof for engagement as at 26 (Figures 2 and 3) with the associated web 6 or 8. Formed on the face 24 of the member is the before-mentioned boss 16 which is threaded internally for connection to the associated stud, as above described. The front surface of the member is formed as a flat friction face 28 for frictional engagement with an associated nonrotatable brake member, as will be clearly understood by those skilled in the art. Formed on the face 24 of the member are top and bottom ribs or lugs 30, 30 adapted for reception within complementary substantially radial slots 34, 34 in the associated web.

Each rib 30 comprises a pair of torque transmitting surfaces or areas 30a which are angularly related or nonparallel to the friction surfaces 28 and preferably are approximately perpendicular thereto, said areas 30a preferably being planar and being engageable with complementary mutually facing torque transmitting surfaces or areas 34a defining opposite sides of the related slot 34. It may be noted that the torque transmitting areas 30a of each member 12 are disposed between its ends so that the members 12 of each unit 12, 14, 12 may expand lengthwise of said members when heated relative to the support structure 2, 6, 8, as during a braking operation when friction is developed along the surfaces 28 of the members 12. As best seen in Figure 1, the surfaces 30a of each member 12 are preferably disposed at opposite sides of and are equally spaced from a radial plane bisecting the unit 12, 14, 12 transversely thereof, said plane being indicated by the segment of line 3—3 in Figure 1 which intersects one of the units illustrated in that figure.

It will be understood that by means of the novel connections, above described, between the members 12, 12 and the webs 6 and 8, the surfaces 28, 28 are permitted to "grow" radially as the result of the intense heat developed thereagainst and the centrifugal force caused by the high rate of rotation to which the rotor is subjected under railway service conditions. The ribs 30, 30 accommodate this radial growth and at the same time interlock the members 12, 12 to prevent rotation thereof with respect to the studs 14, 14. It may also be noted that all of the segmental members 12, 12 which are positioned on the same web are circumferentially spaced from each other and together form a discontinuous annular ring, this arrangement permitting the circumferential growth of each of said members.

It will be appreciated that by the arrangement hereinbefore described, each of the segmental members are allowed to expand volumetrically, in other words, radially, circumferentially and axially of the support structure.

I claim:

1. In a brake rotor, a support structure comprising an annular hub formed at its outer perimeter with spaced webs, annular segmental friction members engaging the remote sides of respective webs, openings through said webs receiving portions of the segments of said members, and means connected between the portions of corresponding segments at opposite sides of the structure for urging said segments into engagement with said webs, each of said means comprising a stud having righthand threads at one end thereof in complementary threaded engagement with the associated portion, said stud having lefthand threads at the opposite end thereof in complementary threaded engagement with the associated portion.

2. In a brake rotor, a steel support structure comprising an annular hub formed at its outer perimeter with spaced substantially parallel annular webs having openings therethrough, pairs of iron friction blocks engaging the remote surfaces of said webs and having portions extending into said openings, and means extending between the blocks of each pair for drawing them toward each other and urging them into engagement with said webs, each of said means being characterized by a stud having right and lefthand threads in complementary threaded engagement with the associated portions.

3. In a brake rotor, a support structure comprising spaced annular webs, friction blocks engaging the remote surfaces of said webs, means for securing said blocks to said webs and for accommodating radial growth of said blocks, said means comprising members extending through openings in said webs, each of said members being in reversely threaded engagement with corresponding blocks at opposite sides of said structure, and approximately radial tongue and groove means interlocking each block with the associated web.

4. In a brake rotor, a support structure comprising spaced webs with aligned round openings therethrough, pairs of friction blocks engaging the remote surfaces of said webs and having round bosses projecting into said openings, a member extending between each pair of blocks in reversely threaded engagement with the respective bosses thereon, and means interlocking each block with the associated web against rotational movement relative to the associated member, said interlocking means permitting radial growth of said blocks.

5. In a brake rotor, a steel support structure comprising spaced webs with aligned round openings therethrough, circumferentially spaced pairs of iron friction blocks on the remote surfaces of said webs, each having a round boss projecting into the associated opening, means extending between the blocks of each pair in engagement with the bosses thereof for drawing said blocks tightly against their respective webs, and means interlocking each block with the associated web, said interlocking means permitting radial growth of said blocks.

6. In a brake rotor, a support structure comprising spaced annular webs, segmental friction members positioned on the remote surfaces of said webs, and means for securing said members to said webs and for accommodating radial growth of said members, said means comprising elements extending through openings in said webs, each of said elements being in reversely threaded engagement with corresponding members at opposite sides of said structure.

7. In a brake rotor, a cast iron support structure comprising spaced webs, a pair of iron friction blocks positioned on the remote surfaces of said webs, and means extending through openings in said webs and connected to the respective blocks for simultaneously drawing them against said structure therebetween, said means comprising a stud in reversely threaded engagement with respective blocks.

8. In a brake rotor, a steel support structure comprising an annular hub formed at its outer perimeter with spaced substantially parallel annular webs having openings therethrough, pairs of iron friction blocks positioned on the remote surfaces of said webs and having portions extending into said openings, and rotatable means extending between the blocks of each pair and adjustably connected thereto, the rotation of said means in one direction simultaneously urging said blocks apart and away from said webs therebetween, the rotation of said means in the opposite direction simultaneously urging said blocks towards each other and against said webs therebetween.

9. In a brake rotor, a steel support structure, pairs of segmental iron members engaging opposite sides thereof, and means engaged with corresponding members at opposite sides of the structure for urging them into engagement therewith, said means comprising bolts each having threaded engagement with both members of one pair.

10. In a brake rotor, a support structure comprising an annular hub formed at its outer perimeter with axially spaced webs, segmental friction members on the remote sides of respective webs, a driving connection between each member and said structure comprising a projection on the rear side of each member substantially centrally thereof and extending within an opening in the associated web, and means between and connected to the projections of corresponding members at opposite sides of the structure for holding the members against said webs and the projections on said members within the respective openings.

11. In a brake rotor, a support structure comprising spaced annular webs, friction members on the remote sides of said webs, each member comprising a wall having a friction surface on its outer side and seated on its inner side against the associated web, said wall having a boss on its inner side extending within a complementary opening in the related web and affording a driving connection between the structure and the associated member, and means between said webs connected to the bosses of the members on respective webs for holding said members against said webs.

12. In a brake rotor, a support structure comprising spaced webs with aligned openings therethrough, circumferentially spaced pairs of friction elements on the remote sides of said webs, each having a complementary boss projecting into the associated opening, means extending between the elements of each pair in engagement with the bosses thereof for urging said elements tightly against the respective webs, and an independent driving connection between the internal side of each element and the external side of the related web.

13. In a brake rotor, a support structure comprising spaced annular webs, a plurality of blocks on the remote surfaces of said webs arranged to form discontinuous friction rings at opposite sides of the structure, and means for removably securing said blocks to said structure in a manner accommodating individual growth of said blocks under service usage, comprising a member between each set of two adjacent blocks of respective rings interconnecting the same at adjacent portions thereof, said portions extending into the respective webs.

14. In a brake rotor, a support structure comprising axially spaced webs, spaced pairs of segmental friction members, one of the members of each pair being arranged to form a friction ring at one side of said structure and seated against the external side of one of said webs, and the other member of each pair being arranged to form a friction ring on the opposite side of the structure and seated against the external side of the other web, an interconnecting element between the members of each pair connected at each end to the associated member approximately centrally thereon, and means on each member surrounding the adjacent end of the associated element and extending into a complementary opening within the related web to afford a driving connection between the member and said structure, each element extending between the webs and being operative to simultaneously hold both of the members of the associated pair against the respective webs.

15. In a brake rotor, a support structure comprising spaced annular webs, circumferentially spaced segmental friction members on the remote surfaces of said webs, means removably securing said members to said webs in a manner accommodating individual volumetric expansion of said blocks, and approximately radial tongue and groove means interlocking each member with the associated web comprising a tongue on each member received within a complementary slot in the associated web.

16. In a brake rotor, a support structure, an annular series of friction blocks forming discontinuous friction rings on opposite sides of said structure, each block presenting an uninterrupted friction surface on its external side and each block being seated on its inner side against said structure, and readily removable means projecting through the opposite sides of said structure between each pair of adjacent blocks, spaced from the external sides thereof and connected to the inner sides thereof.

17. A brake rotor comprising an annular support structure having means for connection to an associated rotatable member, a plurality of friction shoes arranged in spaced relationship to each other around said structure radially outwardly of said means and presenting substantially radial brake faces, each shoe having a pair of flat spaced integral torque transmitting surfaces disposed between its ends and extending from its radially inner perimeter toward its radially outer perimeter, said structure having a pair of flat torque transmitting surfaces engaging respective torque transmitting surfaces of the first-mentioned pair, said surfaces being angularly related to said brake faces, the surfaces of one pair facing each other, and readily removable means extending between and connected to each shoe and an adjacent shoe for maintaining the shoe surfaces in contact with the structure surfaces.

References Cited in the file of this patent

UNITED STATES PATENTS

| | | |
|---|---|---|
| 1,846,560 | Kattwinkel | Feb. 23, 1932 |
| 2,141,164 | Brehm | Dec. 27, 1938 |
| 2,326,961 | McCune | Aug. 17, 1943 |
| 2,553,828 | McCune | May 22, 1951 |
| 2,621,762 | Bachman | Dec. 16, 1952 |

FOREIGN PATENTS

| | | |
|---|---|---|
| 499,589 | Great Britain | Jan. 19, 1939 |